March 25, 1924.  1,488,390
ARTHUR HILL-TREVOR GLENNY
INDEX OR MEANS FOR INDICATING THE DUTIES AND OTHER DATA RELATING TO PERSONS OR OBJECTS
Filed April 9, 1923    4 Sheets-Sheet 1
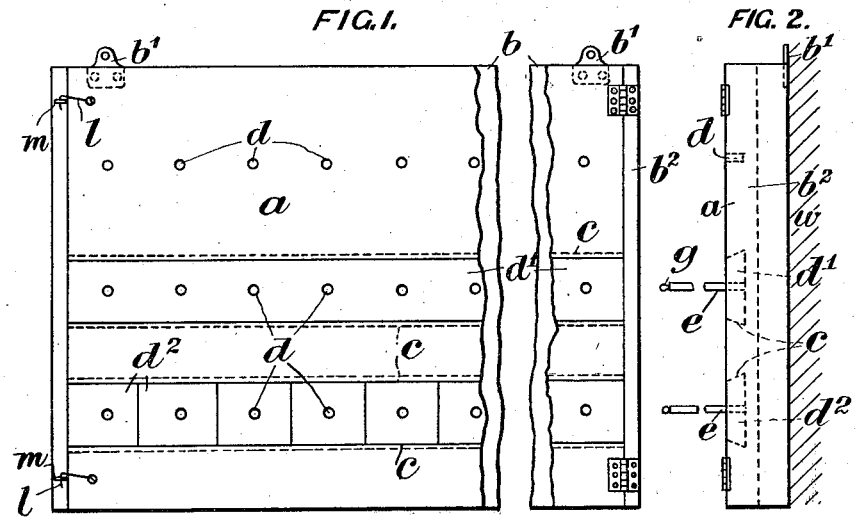
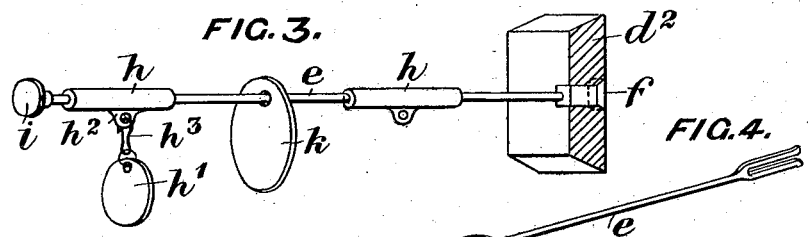
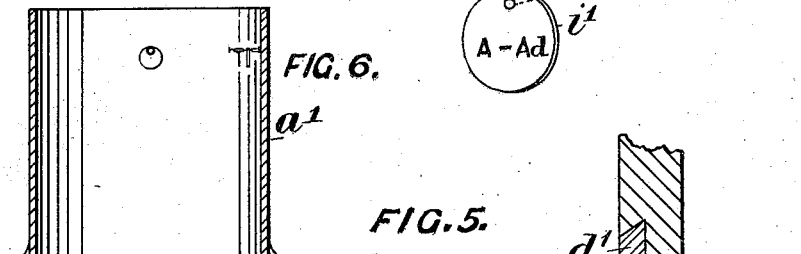
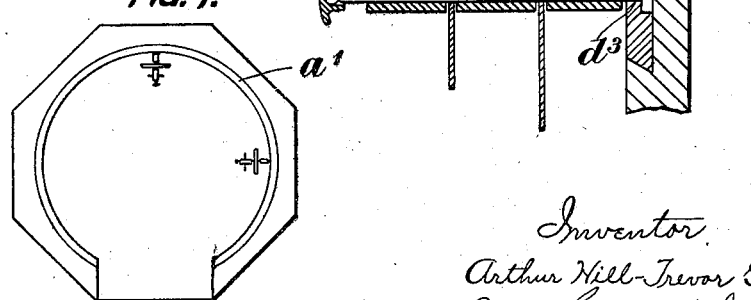

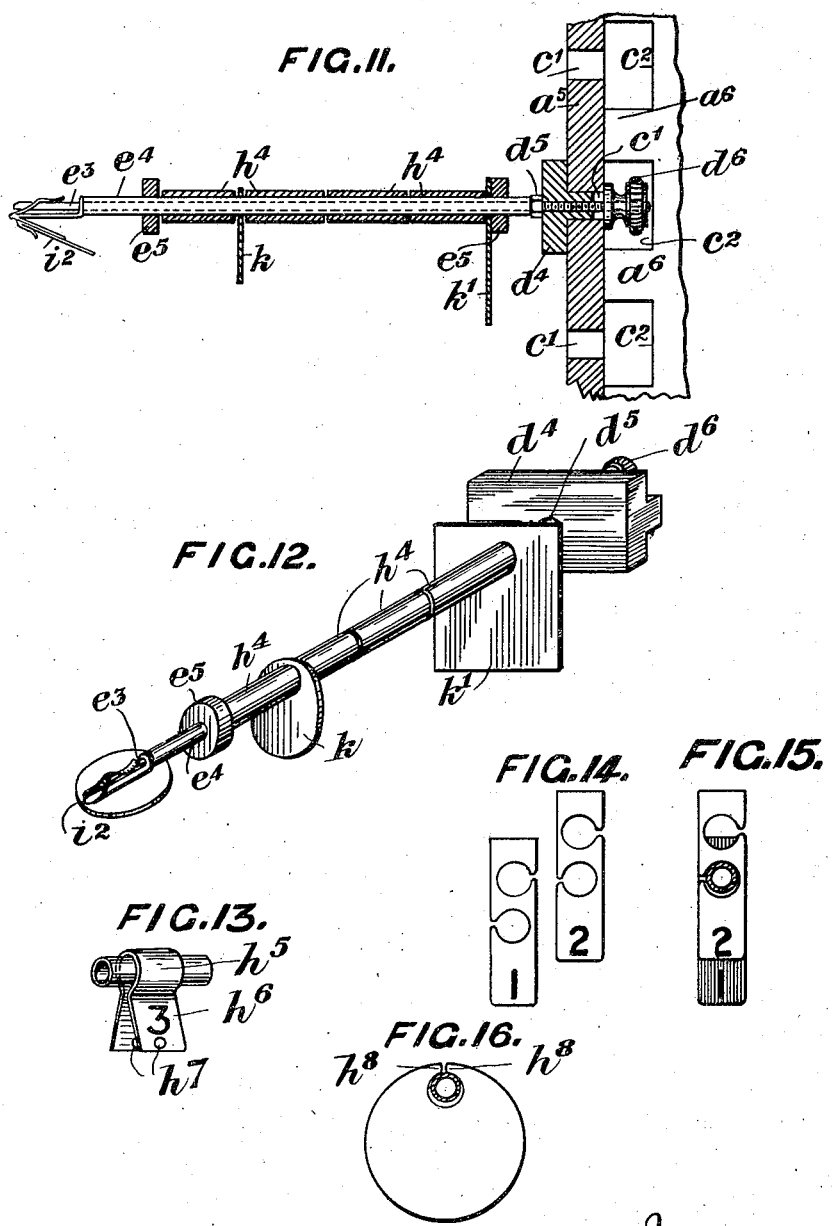

March 25, 1924.

ARTHUR HILL-TREVOR GLENNY
INDEX OR MEANS FOR INDICATING THE DUTIES AND OTHER DATA RELATING TO PERSONS OR OBJECTS
Filed April 9, 1923   4 Sheets-Sheet 4

| WHITE | YELLOW | GREEN | RED | BLUE | PURPLE | BROWN | |
|---|---|---|---|---|---|---|---|
| CARPENTERS | | ELECTRICIANS | TURNERS | FITTERS | | | |
| FOREMAN 1 | | FOREMAN 1 | FOREMAN 1 | FOREMAN 1 | | | |
| CARPENTER 2 | | ELECTRICIAN 2 | TURNER 2 | FITTER 2 | | | |
| APPRENTICE 3 | | APPRENTICE 3 | APPRENTICE 3 | APPRENTICE 3 | | | |
| LABOURER 4 | | LABOURER 4 | LABOURER 4 | LABOURER 4 | | | |
| OFFICE | | WORKSHOP IN LONDON | | WORKSHOP IN BIRMINGHAM | | | |
| MAIN 1 | | CITY 1 | | | | | |
| SUB-OFFICE 2 | | MARYLEBONE 2 | | | | | |
| DRAUGHTSMANS OFFICE 3 | | SOUTH LONDON 3 | | | | | |
| | | | | | | | |

Patented Mar. 25, 1924.

1,488,390

UNITED STATES PATENT OFFICE.

ARTHUR HILL-TREVOR GLENNY, OF PORTSMOUTH, ENGLAND.

INDEX OR MEANS FOR INDICATING THE DUTIES AND OTHER DATA RELATING TO PERSONS OR OBJECTS.

Application filed April 9, 1923. Serial No. 630,862.

*To all whom it may concern:*

Be it known that I, ARTHUR HILL-TREVOR GLENNY, a subject of the King of Great Britain, residing at No. 106ᴬ High Street, Portsmouth, Hampshire, England, have invented certain new and useful Improvements in Indexes or Means for Indicating the Duties and Other Data Relating to Persons or Objects, of which the following is a specification.

This invention relates to improvements in indexes or means for indicating the trade, work or duties and other data relating to persons or objects.

According to this invention, the index or means for indicating the trade or calling and other data relating to persons or objects comprises a rack or base provided with a number of rods, pins or pegs, furnished with indicators such as perforated or slotted discs, collars, tabs, labels or other removable objects adapted to be passed on to the said rods, and knobs or means for securing or preventing the accidental displacement of such discs or other articles. The knobs and discs or other objects are conveniently made of different colours or combinations of colours or shapes to indicate different kinds of work, duties, classes or subjects, and where employed, and some or all are adapted to be inscribed for indicating a person's name, trade or a particular object or other data. In the case of alphabetical or other classification the rack or base may be provided with a number of holes or the like to receive rods, pegs or pins for the attachment of discs or the like, furnished with alphabetical or group indications to facilitate reference. The rack or base may, moreover, be furnished with a number of grooves, slots or the like, each adapted to receive a detachable slide or member, or a series of such slides, to facilitate additions to or adjustment or re-arrangement of the index. The slides or the like are, for example, provided with holes passing right through from front to back, and the rods are furnished with heads which rest against the bottoms of the grooves when the rods have been introduced from the back of the slides and the latter are in place in the rack in order to prevent the rods from becoming displaced. If desired, the holes may be square and the rods are then made with a corresponding square cross section in the vicinity of their heads to prevent the rods from turning. Or the rods may be connected to the rack or to slides held in the rack by furnishing them with screw threads and nuts to hold the rods in place. The free ends of the rods are conveniently formed with securing means such as press-button fastenings for elastically or adjustably securing the knobs or the like thereto. The collars serve as definite indicators according to their colour or position or they may serve for the attachment of labels and for ensuring sufficient space between a disc and a knob or two discs or the like to enable one to read inscriptions on a disc or on both discs without having to move either of them. The discs near to the observer may be smaller than those more remote, so that the latter are not masked by the disc or discs in front of them.

In order that the invention may be readily understood, reference is made to the accompanying drawings, in which:—

Figure 1 is a front elevation of an index constructed according to this invention, and Figure 2 is an end elevation of same.

Figure 3 is a perspective view of one of the rods with its knob and discs, to a larger scale.

Figure 4 is a similar view of a rod with a disc for group or alphabetical indication.

Figure 5 is a sectional side elevation of part of a rack showing a modified arrangement for mounting the rods in a slide in a rack.

Figure 6 is a sectional elevation showing the rods arranged inside a circle or part of a circle instead of on a flat base or rack, and Figure 7 is a plan thereof.

Figure 11 is a sectional side elevation to a larger scale showing the construction of rods or pegs and a different method of securing them in the rack, and Figure 12 is a perspective view of the peg and its adjuncts.

Figure 13 is a perspective view of a modification of tab device.

Figure 14 is an elevation of two tabs of modified form shown separately and

Figure 15 illustrates these tabs used in conjunction.

Figure 16 is a modified construction of disc, and

Figure 17 is a fragmentary view of a key plan for use in connection with the index.

Figure 10:
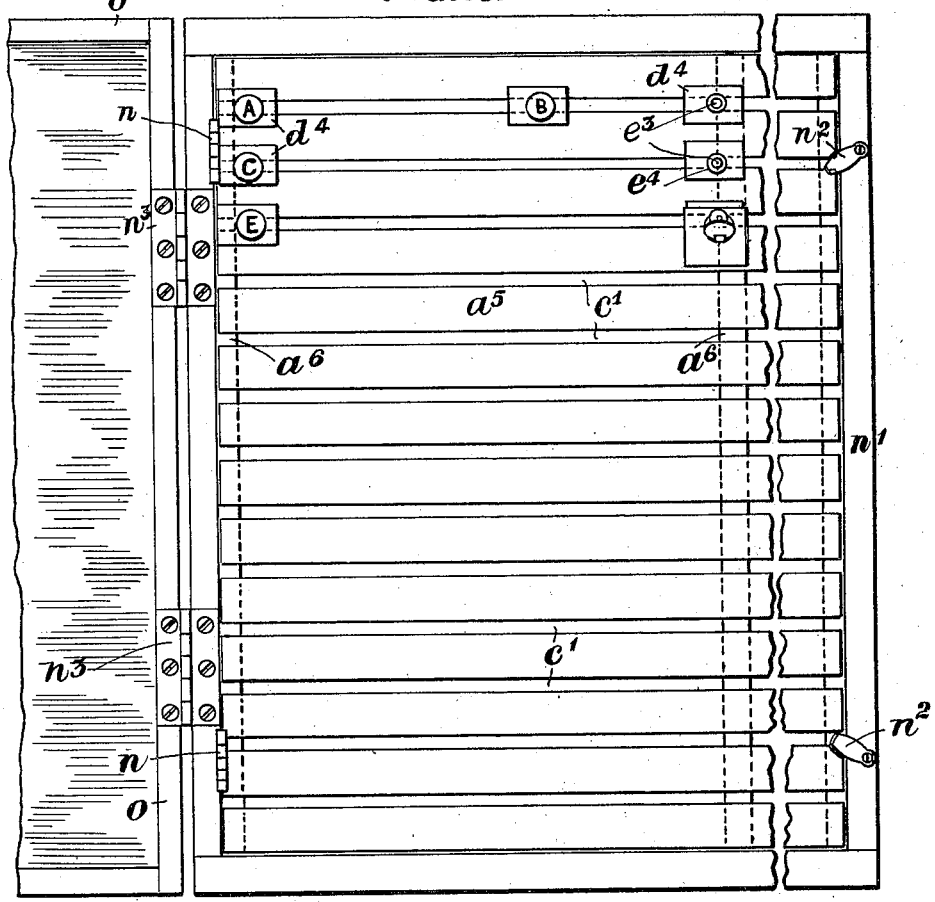
Figure 10 is an elevation of another modified construction.

An index, suitable for use in a large engineering factory as a register or roll of the men, is conveniently constructed as illustrated in Figures 1, 2, 3 and 4. A rack, consisting of a long and wide board or frame $a$ (Figures 1 and 2) of suitable thickness, hinged to a base $b$ at the back, is provided with means, such as mirror plates $b^1$, near each end, and, if desired, at an intermediate place or places, for hanging it by nails or the like flat against or on the wall $w$ and at a uniform height from the ground, within reach and convenient for observation. The face of the rack $a$, as shown in Figures 1 and 2, is provided with a number of holes $d$ arranged horizontally along its length to receive, where required, a number of rods, pins or pegs $e$, some of which are conveniently provided, as shown in Figure 4, with a disc or label $i'$ adapted to be inscribed with letters of the alphabet, such as "A—Ad," "Ae—Am" and so on. Instead of providing the rack itself with holes $d$, it may be furnished with a number of horizontal parallel dove-tail grooves $c$ or the like, as shown in the middle row, each of which is adapted to receive a slide $d'$, shown in the upper groove in Figure 1, and having a number of equidistant holes $d$ bored through the same, and each hole is adapted to receive a short pin or rod $e$ which may be fixed or adjustable. The holes $d$ are horizontal so that the rods $e$ are also horizontal and their outer ends point towards the observer. Preferably, the long slides are divided up into a number of short slides $d^2$, one for each rod $e$, as in the lower part of Figure 1. The holes $d$ in the slides may be square and furnished with metal liners $f$ (see Figure 3) and the rods or the part of a rod nearest the head of each rod may also be of square section to correspond, and split, so as to fit elastically in the holes $d$, as shown in Figure 4. The outer end of each rod is conveniently formed with a small collar, bulb or knob $g$ (Figure 2) and knobs, such as $i$, Figure 3, or discs such as $i'$, Figure 4, suitably provided with press-button fastening members (not shown) to engage the knobs $g$, provide means for securing the discs to the rods $e$. It is, however, obvious that the means for securing the knobs to the rods may be by screwing or otherwise. Each knob or disc $i$ may be of a colour, arbitrarily selected, to indicate the man's trade. For example, red may indicate a turner, white indicates a slotter, blue a milling machinist and so on. The knob $i$ may also have a number inscribed thereon to indicate the man's number. Or an adjoining collar, such as $h$ may have a tab, or a clip with a tab, the clip being elastically held on the collar. The clip, moreover, may have a number or ordinal printed or stamped thereon. The collars $h$ may also be of different colours and each collar $h$ is or may be provided with a short tab $h^2$ having an eyelet hole. The particular colour of the collar $h$ indicates, for example, the rate of pay, whether usual or extraordinary, whether the man is casually or permanently employed and so on, and the label $h^1$, which may be of bone, celluloid or the like, is suitably provided with a spring hook $h^3$ and serves to receive an inscription comprising, for instance, the name of the man or any other detail of interest or information, a second collar $h$, for example, may support a label giving particulars or indicating character or special qualifications. The labels $h^1$ hang down by their own weight clear of a disc $k$ and give an unobstructed view of any inscription thereon. Finally the discs $k$ are also made in various colours, one for each workshop or kind of work and a number or other indication on a disc may represent the particular job, if a stock job or otherwise.

Thus, it will be evident that it is easy to pick out any man's file, to see on the knob $i$ his trade and number, to ascertain by the colour of the collar $h$, his rate of pay, by the label $h^1$ his name and by the disc $k$ the particular workshop and job on which he is generally engaged, or other useful information. Similarly, by counting the discs of the same colour, one can readily estimate the number of men in a certain workshop, and from the knobs the number of men of a trade. If desired, there may be more than one disc and more than one collar or label, and the discs $k$ may be perforated in the middle or to one side as shown in Figure 3, so as to always hang with their inscriptions in the best position for being deciphered. In order to keep the slides $d^2$ in position, the base $b$ is furnished with end-boards $b^2$. The rack is hinged to one of the end-boards so as to close the grooves, and provided with pivoted hooks $l$ engaging in eyes $m$ on the other end-board.

If desired, and as shown in Figure 5, the rods $e^1$ are detachable and are conveniently furnished with heads $e^2$ so that they may be inserted or removed from the holes $d^3$ in the slide $d^1$ when the latter has been removed from the rack $a$ and, when the slide $d^1$ has been re-introduced, the heads $e^2$ prevent any axial movement of the rods. Naturally, these holes are preferably countersunk to receive the heads of the rods, and the rods may be square near their heads or the heads themselves may be square to prevent the rods from turning.

Figure 8:
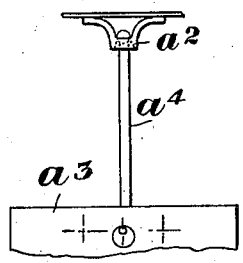
Figure 8 is a fragmentary elevation showing the rods arranged on the outside of a circular rack.
Figure 9:
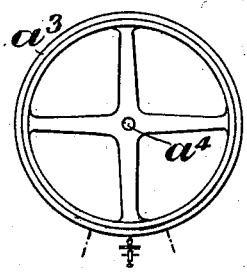
Figure 9 is a plan thereof.

If desired, the rack or base may be mounted on standards and away from the wall, so that both sides of the rack are available for use. Or, on the other hand, the base or rack may be made in superposed sections or tiers so as to reduce its length, provided always that the whole of it be within easy reach and range of vision. Or the rack or base may be mounted in or on vertical guides and provided with a counter-weight or weights so as to be capable of sliding up and down. It will also be clear, as shown in Figures 6 and 7, that the base or rack $a^1$ may be circular, so that the observer may stand in the middle and may see the whole of it without moving, beyond turning round, from the inside of the structure supporting it, or, as shown in Figures 8 and 9, the base or rack $a^3$ may be circular and revoluble, being suspended at $a^2$ from the ceiling by a revoluble and pivotally mounted rod $a^4$ so that the observer himself need not move.

Or, as shown in Figures 10, 11 and 12, the pin or rod $e^3$ is screwed at one end into a flanged slide $d^4$, adapted to fit into the groove or slot $c^1$ in the rack $a^5$. The pin is locked in the slide by a lock nut $d^5$ and is locked as required in place in the slot $c^1$ by means of a milled head nut $d^6$. The members of the rack $a^5$ are connected together by slotted battens $a^6$ (Figures 10 and 11) at the back, and the rack is hinged at $n$ (Figure 10) to a base box or frame $n'$ and is retained in place at the other end by buttons $n^2$. The base, box or frame $n'$ with the rack $a^5$ is, furthermore, hinged at $n^3$ to another box or outer case $o$ which is of such dimensions as to enclose the whole rack with its pins or rods $e^3$ and the knobs, discs, collars and so on mounted thereon. To prevent the index from being tampered with by unauthorized persons, the base or frame $n'$ of the rack $a^5$ and outer case $o$ may be provided with a lock and key (not shown). The slides $d^4$ are readily released from the rack by swinging the latter clear of the frame $n'$ and then unscrewing the nuts $d^6$ whereupon they may be slid along the grooves or guides $c'$ and removed and replaced or shifted and again locked in position as required. In this construction the rack is supposed to be hung rather above the line of sight, and instead of the knob or terminal disc $i^2$ being in the vertical plane, it is inclined as shown in Figures 11 and 12 so that the colour, number or other characteristic or particulars is or are easily inspected. The disc is conveniently clipped in a small bent sheet metal double clip, such as is used for attaching price-tickets to goods for sale, and is adapted to embrace the end of the pin or rod $e^3$. In order to facilitate the assembling of the collars and discs on the body part of the pin or rod $e^3$, a small tube, long collar or sleeve $e^4$ is employed and the collars $h^4$, discs $k$ and discs $k'$ are threaded on the sleeve $e^4$. There may be several collars $h^4$, each indicating, by colour, shape or otherwise, a different characteristic or indication and with or without tabs (such as marked $h^2$, Figure 3). In like manner, there may be one, two or more discs of the same shape or of different shapes or sizes. The sleeves $e^4$ may, moreover, be provided with perforated discs or nuts $e^5$ at one or both ends to hold the collars and discs in place on the sleeves $e^4$. The perforated discs are, conveniently, made of india rubber and so hold friction-tight to retain the intervening collars and discs in place on the sleeves.

It will, however, be evident that in carrying out the invention, many of the details may be varied to suit particular cases.

As compared with the ordinary card indexes, a great saving of time is effected because, according to this invention, one does not normally have to touch the index, one index of this description replaces two or more card indexes, and every item or unit of the whole index is always in view, any one man or trade can be readily found and most of the data for each man can be seen at a glance.

Or, instead of utilizing a knob $i$, as shown in Figure 3, for bearing a number, or instead of furnishing a collar, such as $h$, with a tab $h^2$ having a hole for the attachment of a label, a separate tab may, as shown in Figure 13, be used in the form of an elastic clip $h^5$, adapted to clip on to a rod, tube or collar. The clip is in part circular in the middle, has two depending legs or tabs $h^6$ and is conveniently made of transparent celluloid with a number printed on each leg. The colour of the collar is therefore, visible through the clip and the number may be seen on one side or the other by, at most, a small movement of the observer's head, provided he be sufficiently near to the rack. If desired, the legs or tabs or one of them are or is furnished with a hole $h^7$ by means of which a label may be attached. Two or more of these tabs may be used, side by side, to provide numbering above the number "9."

Or, according to another modification and as shown in Figures 14 and 15, numbered tabs such as marked "2" and "1" may be employed. Each tab is slotted or perforated at a plurality of points and split at each side so that as shown in Figure 15, if the tab 2 be suspended on a rod $e$ or tube $e^4$ by its lower hole and the other tab 1 be similarly suspended by its upper hole, both numbers "2" and "1" will show and may be read as "21" or "12" as determined by the keeper of the index. Naturally, instead of providing each tab with two holes, there may be more than two and the tabs are then made proportionately longer. The tabs, being made of transparent celluloid, do not materially mask the colours of the discs or collars in their vicinity.

Instead of perforating the discs $k$ or $k'$, as shown in Figures 3, 11 and 12, so that they have to be passed on to a rod $e$ or tube $e^4$ from one end or the other, the discs may be slotted or perforated and slit to form two opposite jaws $h^8$, as shown in Figure 16 and being elastic, they may be slipped on to or removed from a rod or tube anywhere by twisting the jaws apart and when in place or removed, the elasticity of the celluloid or other material, of which the disc is made, causes the jaws to resume their normal position in the plane of the disc.

Figure 17 is a diagram of a convenient form of key-plan for use in connection with the index device, its object being to provide a key to the various indicating devices mounted on the index rods. This key-plan is conveniently housed in the lid of the index box, such as the lid $o$ in Figure 10. It consists of a sheet of stiff cardboard, for example, which is ruled or printed with several vertical columns, horizontally divided as seen in Figure 17. At the head of each vertical column, a coloured dot or circle D is drawn or printed, or separate coloured discs are there suspended or fixed, the colours agreeing with the various colours of the knobs, discs, collars and tabs of the index device. The horizontal divisions beneath the head of the columns are used to indicate, in agreement with the index device, the various trades, location, etc., of the men employed. For example, in the first horizontal division, certain trades are shown, namely:—white=carpenters; green =electricians; red=turners; blue=fitters; and so on, each colour denoting a special kind of work. In the four succeeding horizontal divisions beneath, the numbers 1, 2, 3, 4, are given, 1 indicating a foreman, 2 a carpenter, electrician, turner, etc., 3 an apprentice, and 4 a labourer. These first five horizontal divisions thus agree with the knobs $i$, $i^2$, etc., in that they give the trade and number, the numbers showing the men's ranks.

The next group or set of four horizontal divisions deals with the locations of the men. In the first of these four horizontal divisions, there are indicated, the main department or locality so to speak, such as white=office; green=workshops in London; blue=workshops in Birmingham; while in the three remaining divisions, the precise departments or workshops, are indicated, for example: white 1=main office; white 2 =sub-office; white 3=draughting office; green 1=the city workshop in London; green 2=the Marylebone workshop in London, green 3=the South London workshop; etc., each colour in conjunction with the corresponding number, denoting the actual location of the particular individual. This second group of horizontal divisions corresponds with the discs $k$ and subsequent horizontal divisions or groups of divisions could be utilized in a similar manner to indicate other data such as rates of pay, character or qualifications or any special information, as will be readily understood without further illustration. Obviously, instead of placing the coloured dots or the like D at the head of vertical columns, they could be arranged vertically and the other particulars placed alongside the dots in horizontal rows, instead of in vertical columns, as shown in Figure 17, or any other convenient arrangement could be adopted.

I claim:—

1. An index, for indicating particulars of persons or objects, comprising a base, a plurality of rods, adapted to be secured to and project from the said base, a plurality of differing types of indicators, each type being adapted to convey a different kind of information, and to be mounted on the said rods and means detachably secured to the rods for retaining a plurality of the said articles on each rod, substantially as set forth.

2. An index, for indicating particulars of persons or things, comprising a base, a plurality of rods, adapted to be secured to and project from the said base, a plurality of indicators, each adapted to convey different information and to be mounted one behind the other on the said rods, and means detachably secured to the rods for retaining a plurality of said indicators on each rod, substantially as set forth.

3. An index, for indicating particulars of persons or things, comprising a base, a plurality of rods, adapted to be secured to and project from the said base, a plurality of indicating discs and collars, each adapted to convey different information and to be mounted alternately on the said rods, and means for retaining a plurality of said discs and collars on each rod, substantially as set forth.

4. An index, for indicating particulars of persons or things, comprising a base, a plurality of rods adapted to be secured to and project from the said base, a plurality of indicating collars, adapted to be mounted on said rods, a plurality of indicating discs of different sizes, adapted to be mounted alternately with the collars on the said rods, and means for retaining a plurality of said discs and collars on each rod, substantially as set forth.

5. An index, for indicating particulars of persons or things, comprising a base, a plurality of rods, adapted to be detachably secured to and project from the said base, a plurality of indicators, each adapted to convey different information and to be mounted one behind the other on the said rods, and means for retaining a plurality of said indicators on each rod, substantially as set forth.

6. An index, for indicating particulars of persons or things, comprising a base, a plurality of rods, adapted to be detachably secured to and project from the said base, a plurality of indicating collars, adapted to be mounted on the said rods, a plurality of perforated indicating discs, adapted to be mounted alternately with the collars on the said rods, the discs nearer the observer being smaller than those more remote, and means for retaining a plurality of the said collars and discs on each rod, substantially as set forth.

7. An index, for indicating particulars of persons or things, comprising a base, a plurality of rods adapted to be detachably secured to and project from the said base, a plurality of collars adapted to be mounted on the said rods, a plurality of perforated indicating discs adapted to be mounted alternately with the collars on the said rods, and a plurality of terminal discs, each provided with means for detachably securing it to the free end of a rod, substantially as set forth.

8. An index, for indicating particulars of persons or things, comprising a base, a plurality of guides in the said base, a plurality of slides adapted to slide in the said guides, a plurality of rods, adapted to be detachably secured to and project from the said slides, a plurality of indicators, each adapted to convey different information and to be mounted one behind the other on the said rods, and means for retaining a plurality of said indicators on each rod, substantially as set forth.

9. An index, for indicating particulars of persons or things, comprising a base, a plurality of guides in the said base, a plurality of slides adapted to slide in the said guides, a plurality of rods, each detachably mounted on a slide and adapted to project beyond its slide, a plurality of indicators, each adapted to convey different information and to be mounted one behind the other on the said rods, and means for retaining a plurality of said indicators on each rod, substantially as set forth.

10. An index, for indicating particulars of persons or things, comprising a base, a plurality of rods, adapted to be secured to and project from the said base, a plurality of sleeves, one for each rod, a plurality of indicators, each adapted to convey different information and to be mounted, one behind the other, on each of the said sleeves, means for retaining the said indicators on the said sleeves, and means for retaining the sleeves on the rods, substantially as set forth.

11. An index, for indicating particulars of persons or things, comprising a base, a plurality of guides in the said base, a plurality of slides adapted to slide in the said guides, a plurality of rods, each detachably mounted on a slide, a plurality of sleeves, one for each rod, a plurality of indicators, each adapted to convey different information and to be mounted, one behind the other, on each of the said sleeves, means for retaining the said indicators on the said sleeves, and means for retaining the sleeves on the rods, substantially as set forth.

12. An index, for indicating particulars of persons or things, comprising a base, a plurality of guides in the said base, a plurality of slides adapted to slide in the said guides, a plurality of rods, each detachably mounted on a slide, a plurality of sleeves, one for each rod, a plurality of indicators, each adapted to convey different information and to be mounted, one behind the other, on each of the said sleeves, means for retaining the said indicators on the said sleeves, and a plurality of terminal discs serving as indicators and each provided with means for detachably securing it to the free end of a rod, substantially as set forth.

13. An index, for indicating particulars of persons or things, comprising a base, a rack connected to said base, slots in the said rack, serving as guides, a plurality of slides adapted to slide in the said guides, means for securing said slides in the guides, a plurality of rods each mounted on a slide, a plurality of sleeves, one for each rod, a plurality of collars, a plurality of perforated discs, adapted to be mounted alternately with the collars on the said sleeves, means for retaining the said collars and discs on said sleeves and means for retaining the sleeves on the rods, substantially as set forth.

14. An index, for indicating particulars of persons or things, comprising a base, a rack, connected to said base, slots in the said rack, serving as guides, a plurality of slides adapted to slide in the said guides, means for securing the said slides in the guides, a plurality of rods, each mounted on a slide, a plurality of sleeves, one for each rod, a plurality of collars, a plurality of perforated discs adapted to be mounted alternately with the collars on the said sleeves, means for retaining the collars and discs on the said sleeves, and a plurality of terminal discs serving as indicators, and each provided with means for detachably securing it to the free end of a rod, substantially as set forth.

15. An index, for indicating particulars of persons or things, comprising a base, a rack hinged at one end to the said base, means for retaining the rack in the normal closed position, slots in the said rack, serving as guides, a plurality of flanged guides, of which the parts having the smaller diameter are adapted to be contained in the slots, a plurality of rods each furnished with a screw-thread at one end to engage in and pass through the guides, a retaining nut to engage the projecting screw-threaded end of each rod to clamp it in place in the rack, a plurality of sleeves, one for each rod, a plurality of collars, a plurality of perforated discs adapted to be mounted alternately with the collars on the said sleeves, means at each end of a sleeve for retaining the collars and discs on the said sleeves and a plurality of terminal discs, serving as indicators, and each provided with means for detachably securing it to the free end of a rod, substantially as set forth.

16. An index, for indicating particulars of persons or things, comprising an outer case, a base hinged to the said outer case, a rack hinged at one end to the said base, means for retaining the rack in the normal position close to the base, slots in the said rack, serving as guides, a plurality of flanged slides of which the parts having the smaller diameter are adapted to be contained in the slots, a plurality of rods, each furnished with a screw-thread at one end to engage in and project through the guides, a retaining nut to engage the projecting screw-threaded end of each rod to clamp it in place in the rack, a plurality of sleeves, one for each rod, a plurality of collars, a plurality of perforated discs adapted to be mounted alternately with the collars on the said sleeves, means at each end of a sleeve for retaining the collars and discs on the said sleeves and a plurality of terminal discs, serving as indicators and each provided with means for detachably securing it to the free end of a rod, substantially as set forth.

ARTHUR HILL-TREVOR GLENNY.